(12) United States Patent
Hagan et al.

(10) Patent No.: US 7,013,725 B1
(45) Date of Patent: Mar. 21, 2006

(54) SYSTEM AND METHOD FOR REGULATING BRIDGE VOLTAGE IN A DISCONTINUOUS-TIME HOT-WIRE ANEMOMETER

(75) Inventors: Tobin D. Hagan, Dallas, TX (US);
David J. Baldwin, Allen, TX (US);
William E. Grose, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/079,675

(22) Filed: Mar. 14, 2005

(51) Int. Cl.
*G01F 1/68* (2006.01)
(52) U.S. Cl. .................................. 73/204.15
(58) Field of Classification Search ............. 73/204.11, 73/204.14–204.19, 202.5
See application file for complete search history.

(56) References Cited

U.S. PATENT DOCUMENTS 6,752,014 B1 * 6/2004 Kanke et al. ............. 73/204.15
6,786,088 B1 * 9/2004 Matsumura ............... 73/204.15

OTHER PUBLICATIONS

U.S. Appl. No. 10/985,388, entitled "Method of Regulating Resistance in a Discontinuous Time Hot-Wire Anemometer", filed Nov. 9, 2004—21 pages.

* cited by examiner

Primary Examiner—Harshad Patel
Assistant Examiner—Corey D. Mack
(74) Attorney, Agent, or Firm—William B. Kempler; W. James Brady, III; Frederick J. Telecky, Jr.

(57) ABSTRACT

In accordance with the teachings of the present invention, a system and method for regulating bridge voltage in a discrete-time hot-wire anemometer is provided. In a particular embodiment, the hot-wire anemometer includes a bridge circuit including a hot-wire resistor, first and second input terminals, and first and second output terminals, the hot-wire resistor having a resistance dependent at least in part on an airflow past the hot-wire resistor. The hot-wire anemometer further includes a first operational amplifier coupled to the output terminals of the bridge circuit, the first operational amplifier operable to generate an output signal in response to a voltage differential across the first and second output terminals of the bridge circuit, and a second operational amplifier operable to generate an output signal in response to the output signal of the first operational amplifier and to a discontinuous time control signal. A switching mechanism cycles a supply voltage to the input terminals of the bridge circuit in response to output signal of the second operational amplifier such that the supply voltage is intermittently connected to the input terminals the bridge circuit, and an inductor coupling the switching mechanism to the first input terminal of the bridge circuit operable to low-pass filter an output voltage of the bridge circuit.

20 Claims, 2 Drawing Sheets

SYSTEM AND METHOD FOR REGULATING BRIDGE VOLTAGE IN A DISCONTINUOUS-TIME HOT-WIRE ANEMOMETER

TECHNICAL FIELD

This invention relates generally to flow sensors, and more particularly to a system and method for regulating bridge voltage in a discontinuous-time hot-wire anemometer.

BACKGROUND

Hot-wire anemometers are commonly employed as air flow sensors in automobiles, ventilators, and similar equipment. A hot-wire anemometer utilizes a variable resistor, also known as a "hot-wire" resistor, that has a resistance proportional to its temperature to form one arm of a Wheatstone bridge circuit. The other arms of the bridge circuit contain other resistors, one or more of which may also be variable. A power supply is connected across one pair of terminals of the bridge circuit, while an indicator device is connected across the other pair of terminals of the bridge circuit. As current passes through the hot-wire resistor, the temperature of the resistor increases. However, as the airflow past the hot-wire resistor increases, the resistor is cooled, altering its resistance. The resulting resistance imbalance in the bridge circuit, as sensed by the indicator device, is an indication of the mass airflow rate passing the hot-wire resistor.

SUMMARY OF THE INVENTION

In accordance with the teachings of the present invention, a system and method for regulating bridge voltage in a discontinuous-time hot-wire anemometer are provided. In a particular embodiment, the hot-wire anemometer comprises a bridge circuit including a hot-wire resistor, first and second input terminals, and first and second output terminals, the hot-wire resistor having a resistance dependent at least in part on an airflow past the hot-wire resistor. The hot-wire anemometer further includes a first operational amplifier coupled to the output terminals of the bridge circuit, the first operational amplifier operable to generate an output signal in response to a voltage differential across the first and second output terminals of the bridge circuit, and a second operational amplifier operable to generate an output signal in response to the output signal of the first operational amplifier and to a discontinuous time control signal. A switching mechanism cycles a supply voltage to the input terminals of the bridge circuit in response to output signal of the second operational amplifier such that the supply voltage is intermittently connected to the first input terminal of the bridge circuit, and an inductor coupling the switching mechanism to the first input terminal of the bridge circuit operable to low-pass filter an output voltage of the bridge circuit.

A technical advantage of some embodiments of the present invention may include the ability to operate a hot-wire anemometer discontinuously. By operating the anemometer discontinuously, the device may be turned off when a airflow reading is undesired, resulting in lower system power requirements.

Another technical advantage of particular embodiments of the present invention includes the independence of the output voltage of the hot-wire anemometer from fluctuations in the supply voltage. Rather than having an inverse supply dependency, particular embodiments of the present invention employ a low-pass filter comprising an inductor to remove the inverse supply dependency from the system transfer function.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and features and advantages thereof, reference is now made to the following description, taken in conjunction with the accompanying drawings, in which.

DESCRIPTION OF EXAMPLE EMBODIMENTS

In accordance with the teachings of the present invention, a system and method for regulating bridge voltage in a discontinuous-time hot-wire anemometer are provided. Generally, particular embodiments of the present invention introduce an inductor between the switch of a discontinuous-time anemometer and the bridge circuit of the anemometer to low-pass filter the output voltage of the bridge circuit, removing the inverse supply voltage dependence of the anemometer, allowing the anemometers to more accurately reflect airflow past the hot-wire resistor of the anemometer under discontinuous conditions and reducing the overall power requirements of the anemometer.

Figure 1:
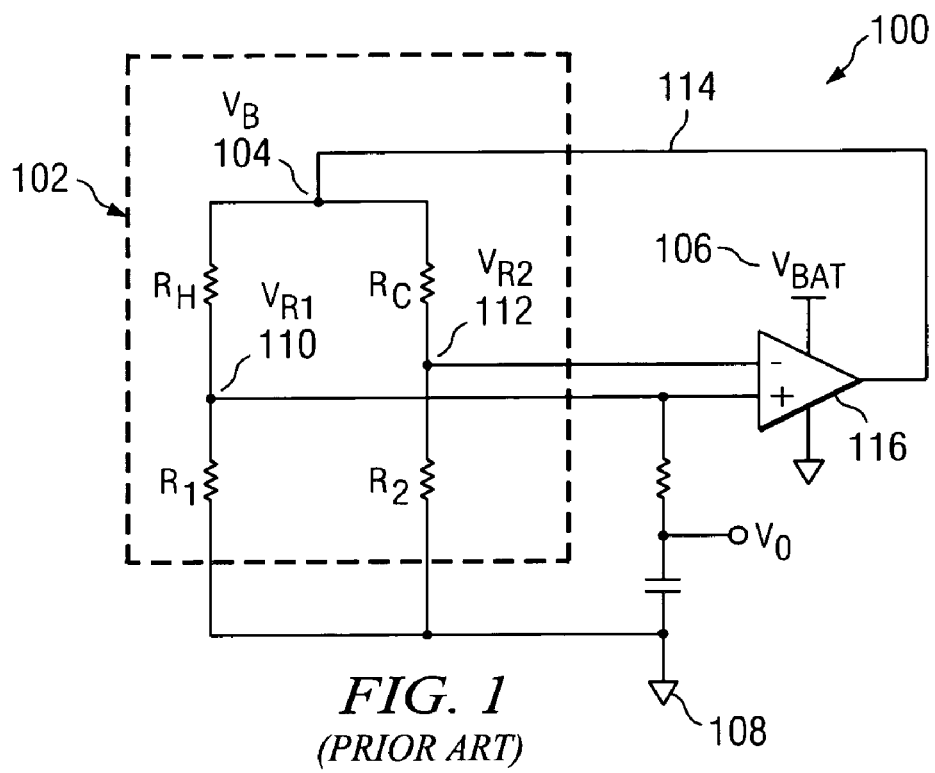
FIG. 1 illustrates a schematic of a typical hot-wire anemometer.

FIG. 1 illustrates one embodiment of a typical continuous-time hot-wire anemometer circuit 100 as is well-known in the prior art. Circuit 100 includes bridge circuit 102, which is commonly referred to as a Wheatstone bridge. As shown in FIG. 1, a variable resistor $R_H$, also know as a hot-wire resistor, forms one leg of bridge circuit 102, while resistors $R_1$, $R_2$, and $R_C$ form the other three legs of bridge circuit 102. In particular embodiments, hot-wire resistor $R_H$ may comprise a platinum wire resistor or any other suitable hot-wire resistor that has a resistance dependent, at least in part, on the temperature of the resistor. Bridge circuit 102 also includes a first terminal 104, a second terminal connected to a reference ground 108, and first and second output terminals 110 and 112, respectively, that connect to a feedback loop 114 that includes operational amplifier 116 coupled to a voltage source 106. Feedback loop 114 feeds back into first terminal 104 and operates to regulate the voltages across $R_H$ and $R_C$.

As mentioned above, the resistance of variable resistor $R_H$ in circuit 100 depends, at least in part, on the temperature of the resistor. As air flows past resistor $R_H$, the resistor is cooled, lowering its resistance. This lowered resistance imbalances the bridge. To compensate for this imbalance the operational amplifier 116 increases the voltage on the bridge. This increase in bridge voltage will increases the current flowing in the hot wire which increases the hot-wire's temperature and resistance. The resulting change in voltage across bridge circuit 102 may be detected at the output voltage, $V_O$, which gives an indication of the airflow past resistor $R_H$.

Under continuous-time regulation, circuit 100 may accurately reflect the airflow past variable resistor $R_H$, regardless of changes in the supply voltage. An example of this supply voltage independence is illustrated in FIG. 2, which illustrates a series of waveforms corresponding to different voltages observed during the operation of circuit 100 (FIG. 1).

Figure 2:
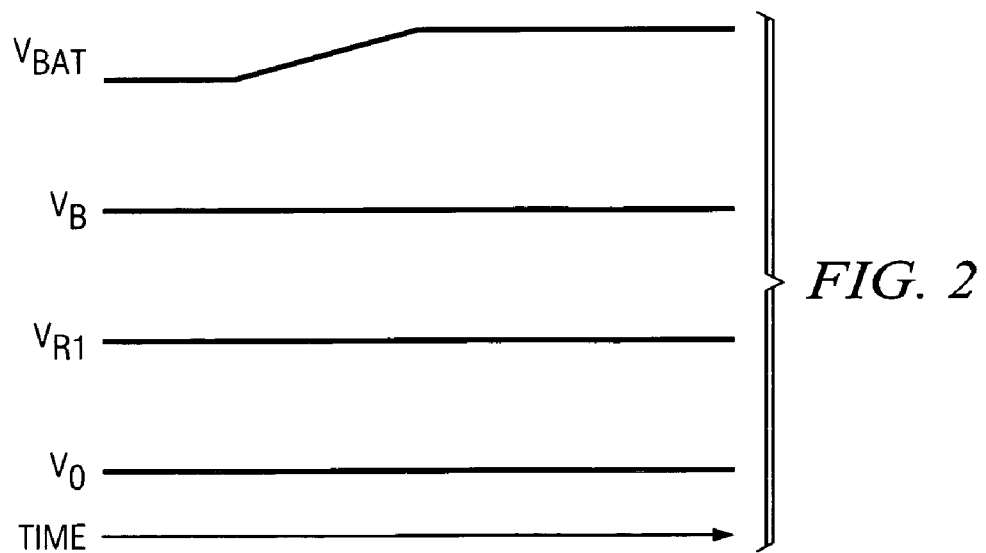
FIG. 2 illustrates a series of waveforms corresponding to voltages in the hot-wire anemometer of FIG. 1.

As shown in FIG. 2, the voltage $V_B$ at input terminal 104 (FIG. 1), voltage $V_{R1}$ at output terminal 110 (FIG. 1), and output voltage, $V_O$, are all independent of the supply voltage, $V_{BAT}$. Thus, as $V_{BAT}$ changes, voltages $V_B$, $V_{R1}$, and $V_O$ all remain constant. However, these waveforms only illustrate the behavior of circuit 100 (FIG. 1) when operated continuously. When operated discontinuously, the output voltage $V_O$ becomes inversely dependent on the supply voltage, which can be problematic in many applications employing anemometers. This inverse supply voltage dependence may be better understood by referring to the following equations.

Generally, the steady state power dissipated, $P_d$, by hot-wire resistor $R_H$ is given by:

$$P_d = I_H^2 R_H = \frac{V_H^2}{R_H} \quad (1)$$

where, $V_H$=voltage across $R_H$, and
$I_H$=current flowing through $R_H$, while the resistance of hot-wire resistor $R_H$ may be calculated using the following equation:

$$R_H = R_{H0}(1+(TC_{RH})(\theta_{ja})(P_d)) \quad (2)$$

where, $R_{H0}$=nominal resistance of RH
$TC_{RH}$=temperature coefficient of $R_H$, and
$\theta_{ja}$=thermal impedance.

The effective current in resistor $R_H$ can be found by applying the following equation:

$$I_H = \frac{V_{BAT}}{R_H + R_1} \quad (3)$$

When circuit 100 is operated discontinuously, the power dissipated in $R_H$ will not be continuous. Instead, circuit 100 has a duty cycle, "DC," that dictates the power dissipated in $R_H$. Substituting equations (2) and (3) into (1) results in the following equation:

$$P_d = I_H^2 R_H DC \quad (4)$$
$$= \left(\frac{(V_{BAT})^2}{(R_H + R_1)^2}\right)[R_{H0}(1+(TC_{RH})(\theta_{ja})(P_d))](DC)$$
$$= \frac{(V_{BAT})^2[R_{H0}+(R_{H0})(TC_{RH})(\theta_{ja})(P_d)](DC)}{[R_1 + R_{H0}+(R_{H0})(TC_{RH})(\theta_{ja})(P_d)]^2}$$

which leads to:

$$\frac{(P_d)[R_1 + R_{H0}+(R_{H0})(TC_{RH})(\theta_{ja})(P_d)]^2}{[R_{H0}+(R_{H0})(TC_{RH})(\theta_{ja})(P_d)]} = (V_{BAT})^2(DC) \quad (5)$$

Assuming that:

$$\frac{(P_d)[R_1 + R_{H0}+(R_{H0})(TC_{RH})(\theta_{ja})(P_d)]^2}{[R_{H0}+(R_{H0})(TC_{RH})(\theta_{ja})(P_d)]} = K \quad (6)$$

at a given airflow rate, the substituting (6) into (5) results in:

$$K = (V_{BAT})^2(DC), \text{ or } DC = \frac{K}{(V_{BAT})^2} \quad (7)$$

By applying voltage division to the circuit, it can be found that:

$$V_O = (V_{BAT})\left(\frac{R_1}{R_1 + R_H}\right)(DC) = (V_{BAT})\left(\frac{R_1}{R_1 + R_H}\right)\left(\frac{K}{(V_{BAT})^2}\right) \quad (8)$$

which simplifies to:

$$\therefore V_O = \left(\frac{R_1}{R_1 + R_H}\right)\left(\frac{K}{V_{BAT}}\right) \quad (9)$$

As indicated by these equations, the teachings of the present invention recognize that the discontinuous time regulation of circuit 100 introduces an inverse supply voltage dependent term into the system transfer function. Because of this, fluctuations in the supply voltage, $V_{BAT}$, will result in fluctuations in the output voltage, $V_O$. This can be problematic in situations were the supply voltage is known to fluctuate, such as in automotive applications. Because of the inverse supply voltage dependence, these supply voltage fluctuations may result in inaccurate airflow readings if not adequately compensated for. One such method of compensating for these fluctuations is shown in FIG. 3.

Figure 3:
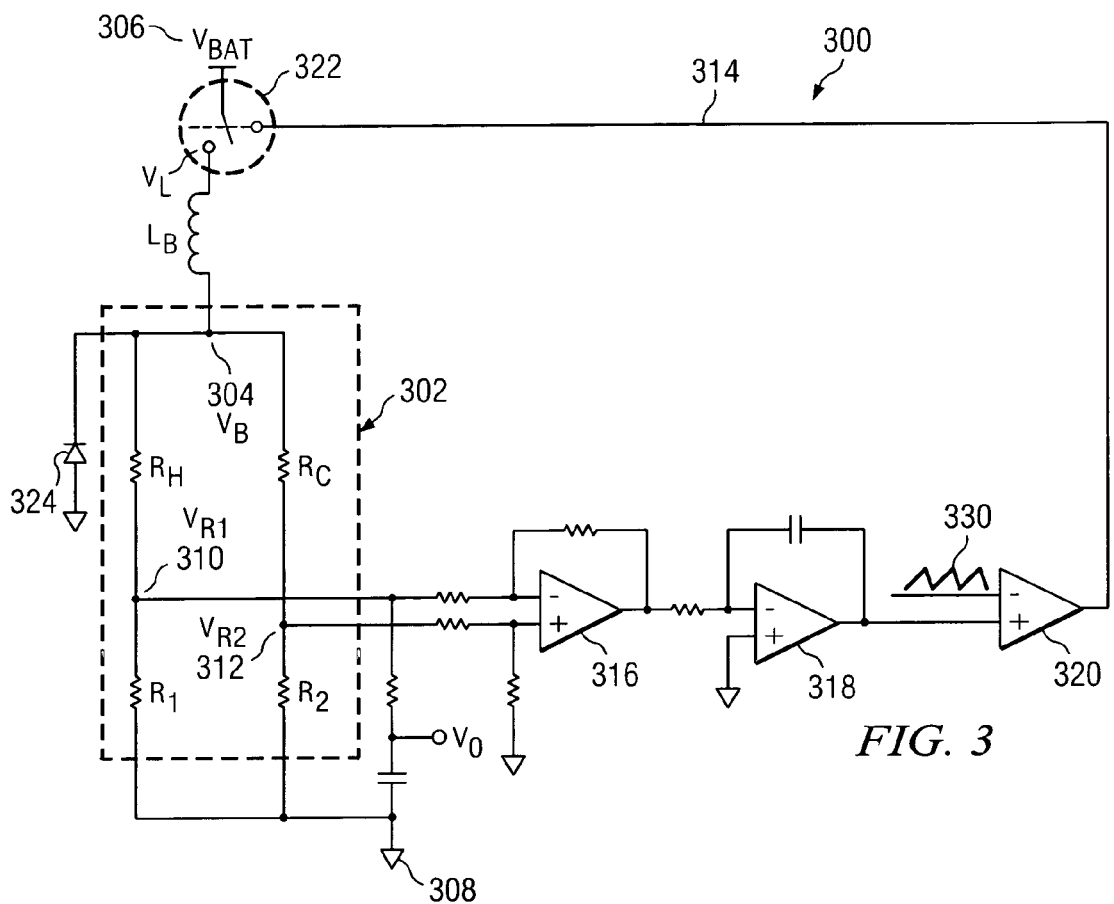
FIG. 3 illustrates a schematic of a hot-wire anemometer in accordance with a particular embodiment of the present invention.

FIG. 3 illustrates a schematic of a hot-wire anemometer circuit 300, which is a discontinuous-time hot-wire anemometer in accordance with a particular embodiment of the present invention. Unlike circuit 100 (FIG. 1), circuit 300 is designed to operate in discontinuous mode with an output voltage independent of the supply voltage. Similar to circuit 100 (FIG. 1), circuit 300 includes a bridge circuit 302. Bridge circuit 302 has a first terminal 304 connected to a voltage source 306 by an inductor $L_B$ and switching mechanism 322; a second terminal connected to a reference ground 308, and first and second output terminals 310 and 312, respectively, connected to a feedback loop 114 that includes operational amplifiers 316, 318, and 320.

Operation amplifiers 316 and 318 work together to detect the integrated difference between voltage $V_{R1}$ at output terminal 310 and voltage $V_{R2}$ at output terminal 312. Operational amplifier 316 detects the voltage differential between $V_{R1}$ and $V_{R2}$, and in particular embodiments applies a gain to the signal. The output of operation amplifier 316 is then fed into operational amplifier 318, which acts as an integrator to produce the integrated voltage differential between $V_{R1}$ and $V_{R2}$. Although FIG. 3 illustrates operational amplifiers 316 and 318 as separate units, particular embodiments of the present invention may combine the functions of operational amplifiers 316 and 318 into a single operational amplifier, as would be understood by one skilled in the art.

The output of operational amplifier 318 is then fed into operational amplifier 320. Operational amplifier 320 is employed to implement a discontinuous time control signal 330 such that the power supply requirements of circuit 300 may be reduced to a desired level. The output of operational amplifier 320 is then used to control the operation of switching mechanism 322, determining the duty cycle of circuit 300. In particular embodiments, switching mechanism 322 may comprise a switching transistor, a MOSFET transistor, or any other suitable device.

Switching mechanism 322 is coupled to bridge circuit 302 by an inductor $L_B$. Inductor $L_B$, in conjunction with the effective resistance of bridge circuit 302, functions to low-pass filter the voltage detected at $V_O$. Because of this low-pass filter, fluctuations in the supply voltage, $V_{BAT}$, have very litte effect on the output voltage, $V_O$. In particular embodiments, inductor $L_B$ may also be supplemented by a capacitor to create the desired low-pass filter, as would be understood in the art. When inductor $L_B$ is disconnected from voltage source 306, the voltage across inductor quickly becomes negative. Therefore, circuit 300 also includes diode 324 that couples input terminal 304 to ground to prevent the voltage across the inductor from dropping too far below ground. In particular embodiments of the present invention, a transistor could be used in place of diode 324, as would be understood by one skilled in the art.

Figure 4:
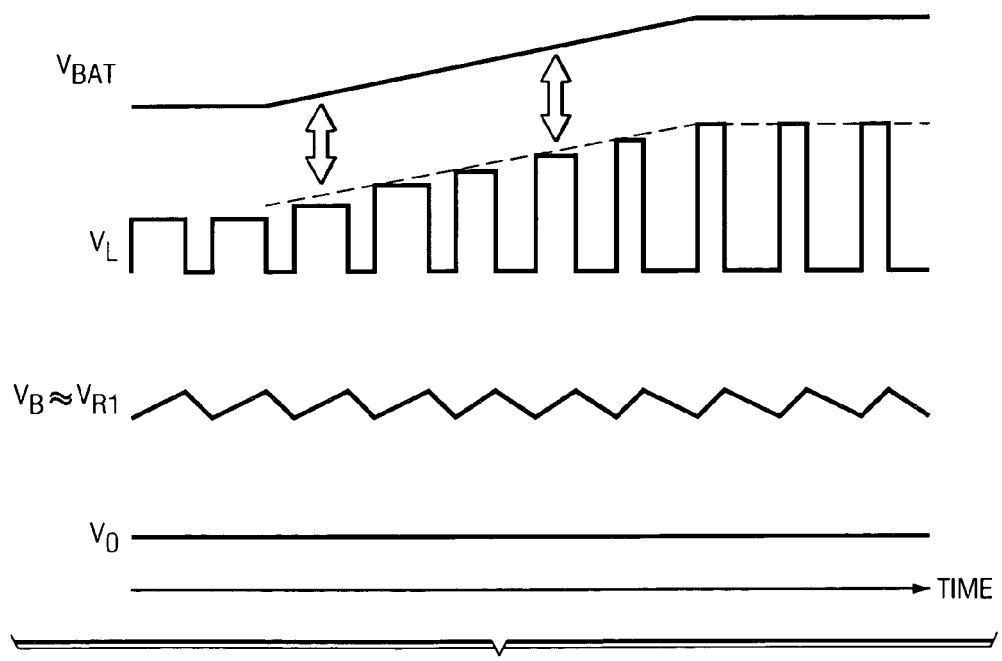
FIG. 4 illustrates a series of waveforms corresponding to voltages in the hot-wire anemometer of FIG. 3.

The result of the above described structure may be seen in FIG. 4, which illustrates a series of waveforms corresponding to various voltages observed during the operation of circuit 300 (FIG. 3). As shown in FIG. 4, as the supply voltage $V_{BAT}$ increases, voltage $V_L$ across inductor $L_B$ from input terminal 304 increases as well. However, rather than increasing linearly, voltage $V_L$ is a step function that fluctuates between ground and $V_{BAT}$. As $V_{BAT}$ increases, the amplitude of $V_L$ also increases. However, while the amplitude of $V_L$ increases, the duty cycle decreases, leaving the area under the curve for each step function the same. Thus, as $V_{BAT}$ increases, circuit 300 (FIG. 3) is connected to the power supply for a shorter amount of time each duty cycle.

In response to voltage $V_L$, voltage $V_B$ at input terminal 304 (FIG. 3) and voltage $V_{R1}$ at output terminal 310 (FIG. 3) result in a similar waveform, although voltages $V_L$ and $V_B$ may be of different amplitude depending on the values of the various resistors in bridge circuit 302 (FIG. 3). In general, voltages $V_B$ and $V_{R1}$ both increase while $V_L$ is equal to $V_{BAT}$, and decrease while $V_L$ is equal to ground. However, as a result of the inclusion of inductor $L_B$ in circuit 300 (FIG. 3), the output voltage, $V_O$, of circuit 300 remains constant, regardless of the changes in $V_{BAT}$.

Because of this supply voltage independence, hot-wire anemometers in accordance with the teachings of the present invention may be used discontinuously to more accurately detect airflow applications where the supply voltage may fluctuate. Due to this discontinuous operation, hot-wire anemometers in accordance with the present invention may activated when an airflow reading is desired and left inactive at other times, reducing the overall power requirements of the airflow sensor employing the anemometer.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A hot-wire anemometer, comprising:
   a bridge circuit including a hot-wire resistor, first and second input terminals, and first and second output terminals, the hot-wire resistor having a resistance dependent at least in part on an airflow past the hot-wire resistor;
   a first operational amplifier coupled to the first and second output terminals of the bridge circuit, the first operational amplifier operable to generate an output signal in response to a voltage differential across the first and second output terminals of the bridge circuit;
   a second operational amplifier operable to generate an output signal in response to the output signal of the first operational amplifier and to a discontinuous time control signal;
   a switching mechanism operable to cycle a supply voltage to the first input terminal of the bridge circuit in response to output signal of the second operational amplifier such that the supply voltage is intermittently connected to the first input terminal of the bridge circuit; and
   an inductor module coupling the switching mechanism to the first input terminal of the bridge circuit operable to low-pass filter an output voltage of the bridge circuit.

2. A hot-wire anemometer, comprising:
   a bridge circuit including a hot-wire resistor, first and second input terminals, and first and second output terminals, the hot-wire resistor having a resistance dependent at least in part on an airflow past the hot-wire resistor;
   a first operational amplifier coupled to the first and second output terminals of the bridge circuit, the first operational amplifier operable to generate an output signal in response to a voltage differential across the output terminals of the bridge circuit;
   a switching circuit coupled to the first input terminal of the bridge circuit by an inductor, the switching circuit operable to cycle a supply voltage to the first input terminal of the bridge circuit in response to the output signal of the first operational amplifier and to a discontinuous time control signal such that current does not continuously flow through the hot-wire resistor; and
   wherein the inductor module is operable to low-pass filter an output voltage of the bridge circuit.

3. The hot-wire anemometer of claim 2, wherein the switching circuit comprises:
   a second operational amplifier operable to generate an output signal in response to the output signal of the first operational amplifier and to the discontinuous time control signal; and
   a switching mechanism operable to cycle the supply voltage to the first input terminal of the bridge circuit in response to the output signal of the second operational amplifier.

4. The hot-wire anemometer of claim 3, further comprising a third operational amplifier operable to integrate the output signal of the first operational amplifier; and wherein the second operational amplifier is operable to generate an output signal in response to the integrated output signal of the first operational amplifier and to the discontinuous time control signal.

5. The hot-wire anemometer of claim 2, wherein the switching mechanism comprises a switching transistor.

6. The hot-wire anemometer of claim 2, wherein the switching mechanism comprises a MOSFET transistor.

7. The hot-wire anemometer of claim 2, wherein the inductor module comprises an inductor and a capacitor.

8. The hot-wire anemometer of claim 2, further comprising a diode coupling the first input terminal of the bridge circuit to ground.

9. The hot-wire anemometer of claim 2, further comprising a transistor coupling the first input terminal of the bridge circuit to ground.

10. The hot-wire anemometer of claim 2, wherein the hot-wire resistor comprises a platinum wire resistor.

11. A method of regulating bridge voltage in a discrete-time hot-wire anemometer, comprising:
   providing a bridge circuit including a hot-wire resistor, first and second input terminals, and first and second output terminals, the hot-wire resistor having a resistance dependent at least in part on an airflow past the hot-wire resistor;
   generating an first output signal at a first operational amplifier in response to a voltage differential across the first and second output terminals of the bridge circuit;
   cycling a supply voltage to the first input terminal of the bridge circuit in response to the first output signal of the first operational amplifier and to a discontinuous time control signal such that current does not continuously flow through the hot-wire resistor; and
   low-pass filtering an output voltage of the bridge circuit by coupling the first input terminal of the bridge circuit to the switching mechanism by an inductor module.

12. The method of claim 11, further comprising generating an second output signal at a second operational amplifier in response to the first output signal of the first operational amplifier and to the discontinuous time control signal; and
   wherein cycling a supply voltage to the first input terminal of the bridge circuit in response to the first output signal of the first operational amplifier and to a discontinuous time control signal comprises cycling the supply voltage to the first input terminal of the bridge circuit in response to the second output signal of the second operational amplifier.

13. The method of claim 12, further comprising integrating the first output signal of the first operational amplifier using a third operational amplifier; and
   wherein generating the second output signal at the second operational amplifier in response to the first output signal of the first operational amplifier and to the discontinuous time control signal comprises generating the second output signal at the second operational amplifier in response to the integrated first output signal of the first operational amplifier and to the discontinuous time control signal.

14. The method of claim 11, wherein cycling the supply voltage comprises cycling a switching transistor.

15. The method of claim 11, wherein cycling the supply voltage comprises cycling a MOSFET transistor.

16. The method of claim 11, wherein the inductor module comprises an inductor and a capacitor.

17. The method of claim 11, further comprising coupling the first input terminal of the bridge circuit to ground using a diode.

18. The method of claim 11, further comprising coupling the first input terminal of the bridge circuit to ground using a transistor.

19. The method of claim 11, wherein the hot-wire resistor comprises a platinum wire resistor.

20. The method of claim 11, wherein the output voltage of the bridge circuit corresponds to the airflow past the hot-wire resistor.

* * * * *